(12) United States Patent
Zhang

(10) Patent No.: US 10,609,430 B2
(45) Date of Patent: ***Mar. 31, 2020

(54) METHOD AND DEVICE FOR PROCESSING MULTIMEDIA FILE, AND STORAGE MEDIUM

(71) Applicant: Tencent Technology (Shenzhen) Company Limited, Shenzhen, Guangdong (CN)

(72) Inventor: Liwei Zhang, Guangdong (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 165 days.

This patent is subject to a terminal disclaimer.

(21) Appl. No.: 15/671,418

(22) Filed: Aug. 8, 2017

(65) Prior Publication Data

US 2017/0339439 A1 Nov. 23, 2017

Related U.S. Application Data

(63) Continuation of application No. PCT/CN2016/081516, filed on May 10, 2016.

(30) Foreign Application Priority Data

Jun. 24, 2015 (CN) .......................... 2015 1 0355215

(51) Int. Cl.
*H04N 21/2389* (2011.01)
*H04N 21/4385* (2011.01)
(Continued)

(52) U.S. Cl.
CPC ... *H04N 21/23895* (2013.01); *H04N 21/2347* (2013.01); *H04N 21/41407* (2013.01);
(Continued)

(58) Field of Classification Search
CPC ................................................ H04N 21/23895
(Continued)

(56) References Cited

U.S. PATENT DOCUMENTS 6,226,618 B1 * 5/2001 Downs .................... G06F 21/10
705/51
8,391,482 B2 * 3/2013 Wee ...................... H04N 7/1675
380/200
(Continued)

FOREIGN PATENT DOCUMENTS

CN 1465159 A 12/2003
CN 1524362 A 8/2004
(Continued)

OTHER PUBLICATIONS

International Search Report for International Application No. PCT/CN2016/081516 dated Jul. 26, 2016 in 3 pages.
(Continued)

*Primary Examiner* — Khalil Naghdali
(74) *Attorney, Agent, or Firm* — Anova Law Group, PLLC

(57) ABSTRACT

A method and a device for processing a multimedia file are provided. In some embodiments, for a multimedia file to be processed, payload data in the multimedia file is acquired, and the payload data includes multi-frame data forming the multimedia file. Some pieces of frame data are selected from the payload data as frame data to be encrypted, and the frame data to be encrypted is encrypted. New payload data is formed by the encrypted frame data and unencrypted frame data, and the new payload data is encoded to obtain an encoded multimedia file. Therefore, the protection of the copyrights of the multimedia file is achieved.

14 Claims, 5 Drawing Sheets

(51) Int. Cl.
*H04N 21/4627* (2011.01)
*H04N 21/414* (2011.01)
*H04N 21/2347* (2011.01)
*H04N 21/4405* (2011.01)
*H04N 21/643* (2011.01)

(52) U.S. Cl.
CPC ... *H04N 21/4385* (2013.01); *H04N 21/43853* (2013.01); *H04N 21/4405* (2013.01); *H04N 21/4627* (2013.01); *H04N 21/64322* (2013.01)

(58) Field of Classification Search
USPC ........................................................ 380/210
See application file for complete search history.

(56) References Cited

U.S. PATENT DOCUMENTS

| | | | | |
|---|---|---|---|---|
| 8,731,193 | B2* | 5/2014 | Farkash | H04N 7/167 375/240.13 |
| 8,972,723 | B2 | 3/2015 | Hutton | |
| 9,621,522 | B2* | 4/2017 | Kiefer | H04L 9/0819 |
| 2004/0028227 | A1 | 2/2004 | Yu | |
| 2004/0064688 | A1 | 4/2004 | Jacobs | |
| 2004/0165722 | A1 | 8/2004 | Van Rijnsoever et al. | |
| 2004/0196972 | A1 | 10/2004 | Zhu et al. | |
| 2007/0033408 | A1 | 2/2007 | Morten | |
| 2008/0212774 | A1* | 9/2008 | Moors | H04N 5/913 380/201 |
| 2008/0317246 | A1* | 12/2008 | Manders | H04N 5/783 380/37 |
| 2011/0135090 | A1* | 6/2011 | Chan | H04N 21/2351 380/210 |
| 2011/0311045 | A1 | 12/2011 | Candelore et al. | |
| 2012/0017084 | A1* | 1/2012 | Hutton | G06F 21/10 713/165 |
| 2015/0181308 | A1* | 6/2015 | Ducharme | H04N 21/23476 380/210 |
| 2015/0256898 | A1* | 9/2015 | Morton | H04L 9/0869 380/210 |
| 2016/0142746 | A1* | 5/2016 | Schuberth | H04N 21/2387 725/31 |

FOREIGN PATENT DOCUMENTS

| | | |
|---|---|---|
| CN | 1535014 A | 10/2004 |
| CN | 1623327 A | 6/2005 |
| CN | 1882082 A | 12/2006 |
| CN | 1933580 A | 3/2007 |
| CN | 1997146 A | 7/2007 |
| CN | 101141408 A | 3/2008 |
| CN | 102025490 A | 4/2011 |
| CN | 102547254 A | 7/2012 |
| CN | 102905133 A | 1/2013 |
| CN | 103003824 A | 3/2013 |
| CN | 103136459 A | 6/2013 |
| CN | 104092680 A | 10/2014 |
| CN | 104462878 A | 3/2015 |
| CN | 104966001 A | 10/2015 |
| CN | 105049941 A | 11/2015 |

OTHER PUBLICATIONS

International Search Report for International Application No. PCT/CN2016/079743 dated Jul. 21, 2016, in 2 pages.

* cited by examiner

METHOD AND DEVICE FOR PROCESSING MULTIMEDIA FILE, AND STORAGE MEDIUM

CROSS REFERENCE TO RELATED APPLICATION

The present application is a continuation of International Application No. PCT/CN2016/081516, titled "MULTIMEDIA FILE PROCESSING METHOD AND APPARATUS", filed on May 10, 2016, which claims the priority to Chinese Patent Application No. 201510355215.X, entitled "METHOD AND DEVICE FOR PROCESSING MULTIMEDIA FILE", filed on Jun. 24, 2015 with the State Intellectual Property Office of the People's Republic of China, both of which are incorporated herein by reference in their entireties.

TECHNICAL FIELD

The present disclosure relates to the field of multimedia technology, and in particular to a method and a device for processing a multimedia file.

BACKGROUND

With the development of mobile internet technology, more and more multimedia content providers publish and sell multimedia information over a network. Because of the uncontrollability of the internet and characteristics of digital media, such as the lossless copy and transmission, the copyright protection of digital multimedia information becomes very difficult.

With respect to this problem, a conventional solution is generally to limit different users to enjoy and download different multimedia files by setting user rights. For example, a multimedia content provider only permits a paid user to enjoy and download specific copyrighted multimedia files. However, the user with permission may issue the downloaded high-quality multimedia files onto the network, and other users can also enjoy the high-quality multimedia files even without the permission. Obviously, although the conventional technology has limited piracy to some extent, there is still a need for improved techniques to further protect the copyright of digital multimedia information.

SUMMARY

In view of the above, a method and a device for processing a multimedia file are provided according to the present disclosure, to better protect the copyright of digital multimedia information.

In an aspect, a method for processing a multimedia file is provided, which includes acquiring payload data in the multimedia file. The payload data includes multi-frame data forming the multimedia file. The method further includes selecting frame data to be encrypted from the payload data based on a pre-set strategy. The method further includes encrypting the frame data to be encrypted. The method further includes forming new payload data by the encrypted frame data and unencrypted frame data, and encoding the new payload data to obtain an encoded multimedia file.

In another aspect, a method for processing a multimedia file is provided, which includes decoding a target multimedia file, in response to an operation of triggering the target multimedia file by a user, to obtain payload data formed by multi-frame data. The payload data includes encrypted frame data and unencrypted frame data. The method further includes determining whether the user has permission to decrypt the target multimedia file. The method further includes performing multimedia playback by using the unencrypted frame data in the payload data, in a case that it is determined that the user does not have the permission to decrypt the target multimedia file. The method further includes decrypting the encrypted frame data in the payload data by means of a pre-set decryption algorithm corresponding to the target multimedia file to obtain decrypted frame data, in a case that it is determined that the user has the permission to decrypt the target multimedia file. The pre-set decryption algorithm corresponding to the target multimedia file matches an encryption algorithm used to encrypt the target multimedia file. The method further includes performing multimedia playback by using the decrypted frame data and the unencrypted frame data.

In another aspect, a device for processing a multimedia file is provided, which includes a payload data acquiring unit configured to acquire payload data in the multimedia file. The payload data includes multi-frame data forming the multimedia file. The device further includes a payload data selecting unit configured to select frame data to be encrypted from the payload data based on a pre-set strategy. The device further includes an encryption processing unit configured to encrypt the frame data to be encrypted and form new payload data by the encrypted frame data and unencrypted frame data, and an encoding processing unit configured to encode the new payload data to obtain an encoded multimedia file.

In another aspect, a device for processing a multimedia file is provided, which includes a multimedia file decoding unit configured to decode a target multimedia file, in response to an operation of triggering the target multimedia file by a user, to acquire payload data formed by multi-frame data. The payload data includes encrypted frame data and unencrypted frame data. The device further includes a user permission determining unit configured to determine whether the user has permission to decrypt the target multimedia file. The device further includes a first multimedia playback unit configured to perform multimedia playback by using the unencrypted frame data in the payload data, in a case of a negative determination from the user permission determining unit. The device further includes a decryption processing unit configured to decrypt the encrypted frame data in the payload data by means of a pre-set decryption algorithm corresponding to the target multimedia file to obtain decrypted frame data, in a case of a positive determination from the user permission determining unit. The pre-set decryption algorithm corresponding to the target multimedia file matches an encryption algorithm used to encrypt the target multimedia file. The device further includes a second multimedia playback unit configured to perform multimedia playback by using the decrypted frame data and the unencrypted frame data.

In another aspect, it is also provided a non-transitory computer storage medium comprising a computer executable instruction, wherein the computer executable instruction is adapted to perform the above method for processing a multimedia file.

As may be seen from the above technical solutions, based on the method for processing a multimedia file according to embodiments of the present disclosure, for a multimedia file whose copyright is to be protected, payload data in the multimedia file is acquired. The payload data includes multi-frame data forming the multimedia file. Some pieces of frame data are selected from the payload data as frame data to be encrypted, and the frame data to be encrypted is encrypted. An encryption identifier is set in a frame header of the encrypted frame data. New payload data is formed by the encrypted frame data and unencrypted frame data, and the new payload data is encoded to obtain an encoded multimedia file. For the multimedia file provided according to the solutions of the present application, only with the decryption permission corresponding to the multimedia file can a user decrypt and play the lossless multimedia file. Therefore, even though a user with the decryption permission transfers the downloaded multimedia file to other users, the other users will not be able to play the lossless multimedia file without the decryption permission of the multimedia file, thereby achieving the protection of the copyrights of the multimedia file.

Further, with the method for processing a multimedia file according to the present disclosure, the encryption depth of the payload data may be controlled by adjusting the pre-set strategy. For users without the decryption permission, they cannot enjoy the decrypted lossless multimedia file, but can still play the multimedia file with a low quality, and the play quality may be controlled by providers by adjusting the pre-set category.

BRIEF DESCRIPTION OF THE DRAWINGS

To illustrate technical solutions according to embodiments of the present disclosure more clearly, drawings to be used in the descriptions of the embodiments are described briefly hereinafter. The drawings described hereinafter are only for some embodiments of the present disclosure, and other drawings may be obtained by those skilled in the art based on those drawings.

DETAILED DESCRIPTION OF THE EMBODIMENTS

Technical solutions of embodiments of the present disclosure are illustrated clearly and completely in conjunction with the drawings of the embodiments of the present disclosure. Apparently, the described embodiments are merely a few rather than all of the embodiments of the present disclosure. All other embodiments obtained by those skilled in the art based on the embodiments of the present disclosure shall fall within the protection scope of the present disclosure.

Figure 1:
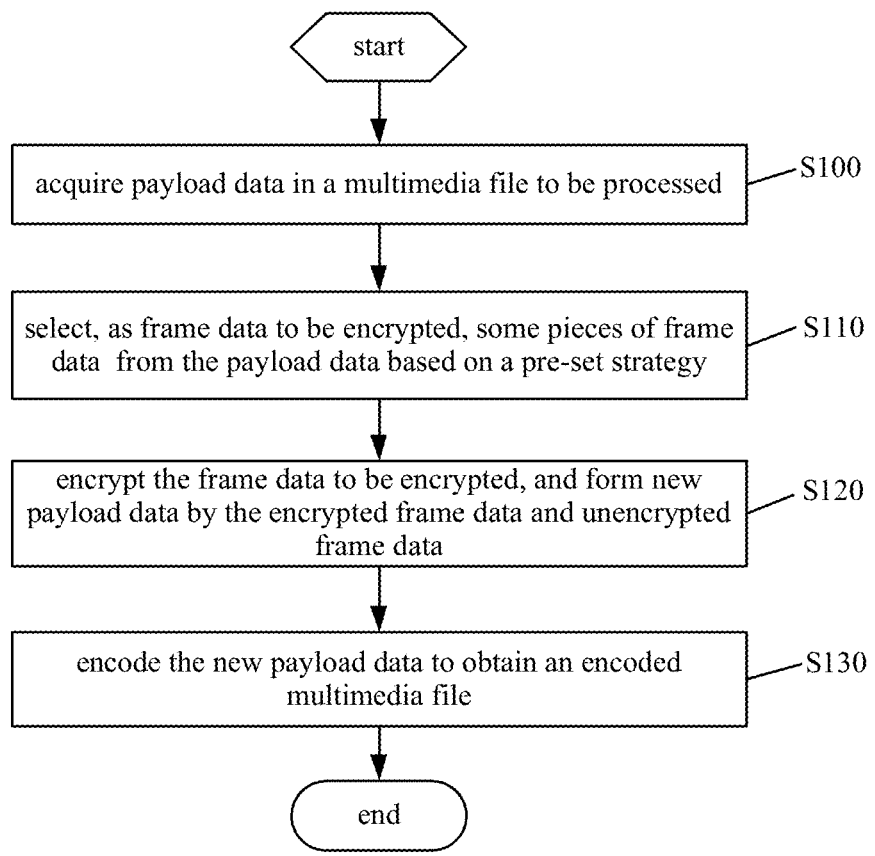
FIG. 1 is a flow chart of a method for processing a multimedia file according to an embodiment of the present disclosure.

Reference is made to FIG. 1, which is a flow chart of a method for processing a multimedia file according to an embodiment of the present disclosure.

As shown in FIG. 1, the method includes steps S100 to S103.

In step S100, payload data in a multimedia file to be processed is acquired.

The payload data includes multi-frame data forming the multimedia file. For the multimedia file whose copyright needs to be protected, the following processing may be performed according to the solutions of the present disclosure.

The multimedia file may be music, video, text and any combination thereof. In a case that the multimedia file is music, the frame data of the multimedia file is audio data over a period of time, such as audio data of 2 ms. In a case that the multimedia file is a video, one frame of data of the multimedia file is data of one image.

In step S110, frame data to be encrypted is selected from the payload data based on a pre-set strategy.

For the obtained payload data, some or all pieces of frame data may be selected as the frame data to be encrypted based on the pre-set strategy.

It is to be understood that, the more the selected frame data to be encrypted is, the deeper the encryption depth is.

There may be various strategies for selecting the frame data to be encrypted. For example, the frame data to be encrypted may be selected according to positions of the frame data in the payload data and the number of the frame data.

In step S120, the frame data to be encrypted is encrypted.

Optionally, an encryption identifier may be set in a frame header of the encrypted frame data.

The encryption identifier is configured to identify the frame data which has been encrypted. In the subsequent playback by a player, it is determined whether to decrypt the frame data according to whether the frame data carries the encryption identifier.

In step S120, some pieces of frame data in the payload data is encrypted and the other of the frame data is not encrypted, and new payload data is formed by the encrypted data and the unencrypted frame data.

In step S130, the new payload data is encoded to obtain an encoded multimedia file.

In an exemplary embodiment, each of the frame data in the new payload data is encoded in a frame level to obtain a multimedia file. The multimedia file may be uploaded to a website of a multimedia provider, for enjoying and downloading by users.

It is to be understood that, the mentioned encryption processing may be performed in units of frames. Each frame of the selected frame data to be encrypted is encrypted to obtain multiple frames which are respectively encrypted. The frame data which is not encrypted forms unencrypted frames. The new payload data is formed by the encrypted frames and the unencrypted frames, and is encoded frame by frame to form the encoded multimedia file.

It is to be understood that, the multimedia file may be a multimedia file which has been encoded and/or compressed, or may be multimedia data which has not been encoded. In a case that the multimedia file is the multimedia data which has not been encoded, frame data corresponding to respective frames may be determined by means of a conventional technology, such as a frame determination technology, after the payload data in the multimedia data is determined, and frame data corresponding to frames to be encrypted is selected from the frame data. In a case that the multimedia file is the multimedia file which has been encoded, the multimedia file may be decoded frame by frame to obtain the payload data in units of frames, and frame data corresponding to the frames to be encrypted is selected from the frame data.

Based on the method for processing a multimedia file according to the embodiment of the present disclosure, for a multimedia file whose copyright is to be protected, payload data in the multimedia file is acquired. The payload data includes multi-frame data forming the multimedia file. Some pieces of frame data are selected from the payload data as frame data to be encrypted, and the frame data to be encrypted is encrypted. An encryption identifier is set in a frame header of the encrypted frame data. New payload data is formed by the encrypted frame data and unencrypted frame data, and the new payload data is encoded to obtain an encoded multimedia file. For the multimedia file provided according to the solutions of the present application, only with the decryption permission corresponding to the multimedia file can a user decrypt and play the lossless multimedia file. Therefore, even though a user with the decryption permission transfers the downloaded multimedia file to other users, the other users will not be able to play the lossless multimedia file without the decryption permission of the multimedia file, thereby achieving the protection of the copyrights of the multimedia file.

Further, with the method for processing a multimedia file according to the present disclosure, the encryption depth of the payload data may be controlled by adjusting the pre-set strategy. For users without the decryption permission, they cannot enjoy the decrypted lossless multimedia file, but can still play the multimedia file with a low quality, and the play quality may be controlled by providers by adjusting the pre-set category.

Generally, a multimedia file provider may provide an application APP to users to enjoy multimedia, such as a music player or a video player. In playing a multimedia file which has been encrypted, the application can decrypt the decoded multimedia file by means of a decryption algorithm pre-stored in the application or issued by a server, the decryption algorithm corresponding to the multimedia file. And then the lossless multimedia file can be played.

Optionally, the payload data in the multimedia file to be processed may be acquired by decoding the multimedia file to be processed in a frame level.

Optionally, the encrypting the frame data to be encrypted may be encrypted by means of various encryption algorithms, such as a commonly used symmetric encryption algorithm.

The process of encrypting the frame data is described below in conjunction with an exemplary embodiment.

Since the payload data includes multiple pieces of consecutive fame data, some pieces of consecutive fame data may be selected from any position as the frame data to be encrypted, and are encrypted. The encrypted fame data cannot be normally played until being decrypted.

Except the above method, a second pre-set number of pieces of consecutive fame data may be selected, as the frame data to be encrypted, from the payload data at an interval of a first pre-set number of pieces of fame data. Both the first pre-set number and the second pre-set number may be adjusted according to practical requirements.

Two regular encryption methods are described above merely for illustration. In addition, the frame data may be encrypted in various other encryption methods.

For ease of understanding, the following example is taken for description.

It is assumed that the multimedia file to be processed is a video file, and payload data in the video file includes ten pieces of frame data. In encrypting the frame data, the starting two pieces of frame data may be selected as the frame data to be encrypted, or a first piece of frame data and a next piece of frame data at an interval of one piece of frame data may be selected as the frame data to be encrypted. Obviously, in the two encryption methods, if a user does not have decryption permission, a situation of missing frames will occur in a playback video file, and the video quality will be reduced.

It is to be understood that, the more the encrypted frame data is, the deeper the encryption depth is. For a user without the decryption permission, the quality of a multimedia file enjoyed by the user will be lower.

The process of encrypting the multimedia file and playing a video on demand of a user is described in the following by taking as an example that the multimedia file is music.

Assumed that a provider 1 wants to protect the copyright of a song A, the song A may be encrypted by means of the above encryption method according to the embodiment of the present disclosure, and the encrypted song A is issued onto a target website of the provider 1. The provider 1 may set that only a paid member user has the decryption permission, i.e., only the paid member user can enjoy the lossless song A. When a paid member user successfully logs in the target website and clicks the song A for playback, a player provided by the target website can obtain a decryption algorithm corresponding to the song A, decode and decrypt the song A, and finally achieve the lossless playback of the song A.

Even if the paid member downloads the song A locally, and transfers it to other unpaid users, the unpaid users cannot decrypt the encrypted song A and play the lossless song A, no matter what kind of players are used, because the unpaid users do not have the decryption permission for the song A, thereby protecting the copyright of the song A.

In addition, the present disclosure does not encrypt the whole of the multimedia file, but encrypt some pieces of fame data in the multimedia file, so that non-member users without the decryption permission can enjoy the multimedia file with a low quality, as well, thereby improving the friendliness for the non-member users.

Hereinafter a device for processing a multimedia file according to an embodiment of the present disclosure is described. The device for processing a multimedia file described in the following may refer to the corresponding method for processing a multimedia file described in the above, mutually.

Figure 2:
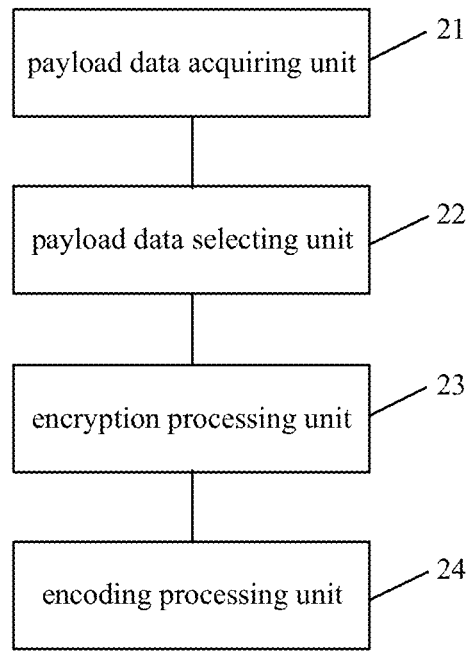
FIG. 2 is a schematic structural diagram of a device for processing a multimedia file according to an embodiment of the present disclosure.

Reference is made to FIG. 2, which is a schematic structural diagram of a device for processing a multimedia file according to an embodiment of the present disclosure.

As shown in FIG. 2, the device includes a payload data acquiring unit 21, a payload data selecting unit 22, an encryption processing unit 23 and an encoding processing unit 24.

The payload data acquiring unit 21 is configured to acquire payload data in the multimedia file to be processed. The payload data includes multi-frame data forming the multimedia file.

The payload data selecting unit 22 is configured to select frame data to be encrypted from the payload data based on a pre-set strategy.

The encryption processing unit 23 is configured to encrypt the frame data to be encrypted. Optionally, the encryption processing unit 23 is configured to set an encryption identifier in a frame header of the frame data to be encrypted, and form new payload data by the encrypted frame data and unencrypted frame data. The encryption identifier is configured to identify the frame data which has been encrypted.

The encoding processing unit 24 is configured to encode the new payload data to obtain an encoded multimedia file.

Figure 3:
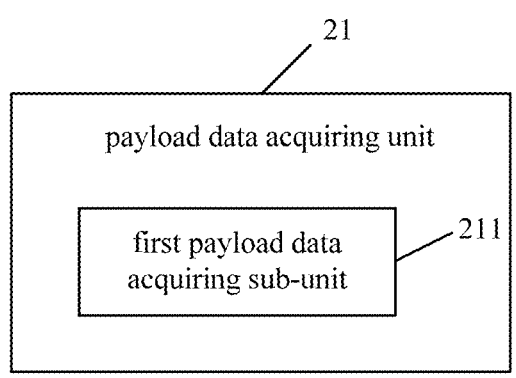
FIG. 3 is a schematic structural diagram of a payload data acquiring unit according to an embodiment of the present disclosure.

Optionally, as shown in FIG. 3, the payload data acquiring unit 21 may include a first payload data acquiring sub-unit 211.

The first payload data acquiring sub-unit 211 is configured to decode the multimedia file to be processed to obtain the payload data formed by the multi-frame data.

Figure 4:
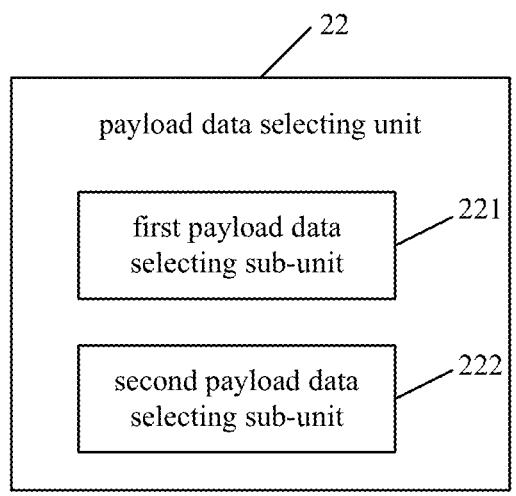
FIG. 4 is a schematic structural diagram of a payload data selecting unit according to an embodiment of the present disclosure.

Optionally, as shown in FIG. 4, the payload data selecting unit 22 may include a first payload data selecting sub-unit 221 and a second payload data selecting sub-unit 222.

The first payload data selecting sub-unit 221 is configured to select, as the frame data to be encrypted, some pieces of consecutive fame data from the payload data.

The second payload data selecting sub-unit 222 is configured to select, as the frame data to be encrypted, a second pre-set number of pieces of consecutive fame data from the payload data at an interval of a first pre-set number of pieces of fame data.

Figure 5:
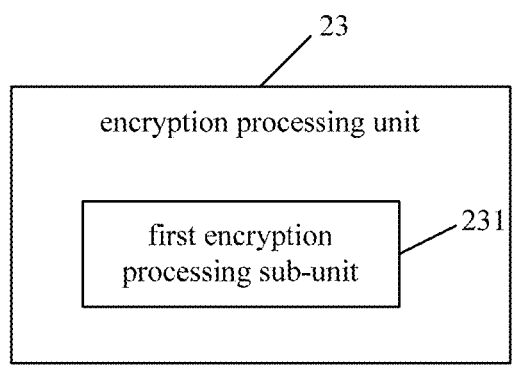
FIG. 5 is a schematic structural diagram of an encryption processing unit according to an embodiment of the present disclosure.

Optionally, as shown in FIG. 5, the encryption processing unit 23 may include a first encryption processing sub-unit 231.

The first encryption processing sub-unit 231 is configured to encrypt the frame data to be encrypted by means of a symmetric encryption algorithm.

Based on the device for processing a multimedia file according to the embodiment of the present disclosure, for a multimedia file whose copyright is to be protected, payload data in the multimedia file is acquired. The payload data includes multi-frame data forming the multimedia file. Some pieces of frame data are selected from the payload data as frame data to be encrypted, and the frame data to be encrypted is encrypted. An encryption identifier is set in a frame header of the encrypted frame data. New payload data is formed by the encrypted frame data and unencrypted frame data, and the new payload data is encoded to obtain an encoded multimedia file. For the multimedia file provided according to the solutions of the present application, only with the decryption permission corresponding to the multimedia file can a user decrypt and play the lossless multimedia file. Therefore, even though a user with the decryption permission transfers the downloaded multimedia file to other users, the other users will not be able to play the lossless multimedia file without the decryption permission of the multimedia file, thereby achieving the protection of the copyrights of the multimedia file.

Further, with the device for processing a multimedia file according to the present disclosure, the encryption depth of the payload data may be controlled by adjusting the pre-set strategy. For users without the decryption permission, they cannot enjoy the decrypted lossless multimedia file, but can still play the multimedia file with a low quality, and the play quality may be controlled by providers by adjusting the pre-set category.

Another method for processing a multimedia file is provided according to another embodiment of the present disclosure, to play a multimedia file obtained based on the above method. The method according to the embodiment may be applied to a player, and the player may be provided by a website of a multimedia provider.

Figure 6:
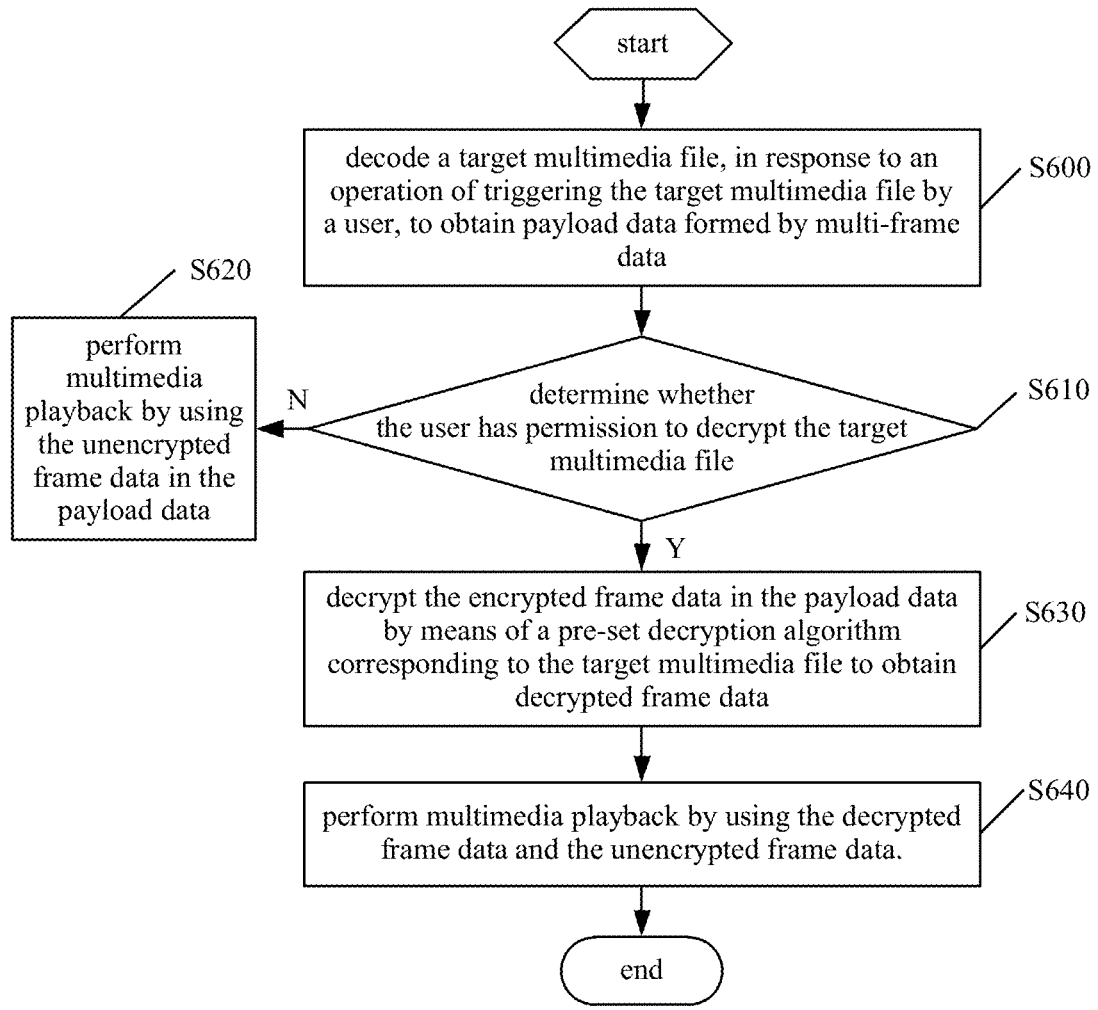
FIG. 6 is a flow chart of a method for processing a multimedia file according to another embodiment of the present disclosure.

Reference is made to FIG. 6, which is a flow chart of a method for processing a multimedia file according to another embodiment of the present disclosure.

As shown in FIG. 6, the method includes steps S600 to S640.

In step S600, a target multimedia file is decoded, in response to an operation of triggering the target multimedia file by a user, to obtain payload data formed by multi-frame data.

Upon an operation of triggering a target multimedia file by a user, such as clicking, a player will receive and decode the target multimedia file. In an embodiment, the payload data formed by the multi-frame data may be acquired by decoding in a frame level.

According to the embodiment of the present disclosure, the payload data includes encrypted data and unencrypted data. In some embodiments, the encrypted data carries an encryption identifier configured to identify the data that has been encrypted.

In step S610, it is determined whether the user has permission to decrypt the target multimedia file. If not, the method proceeds to step S620, and if so, the method proceeds to step S630.

In step S620, multimedia playback is performed by using the unencrypted data in the payload data.

Specifically, it is determined whether the user has the permission to decrypt the target multimedia file according to whether the user has purchased the copyright of the target multimedia file, or according to whether the user identity meets a pre-set condition. For example, a website may upgrade the paid users to be member users, and the member users have the permission to decrypt all the target multimedia files.

In a case that it is detected that the user does not have the permission to decrypt the target multimedia file, multimedia playback is performed by directly using the payload data. In this case, although the payload data includes some pieces of encrypted frame data, multimedia playback can still be achieved, but the quality of the played multimedia will be reduced.

In step S630, the encrypted frame data in the payload data is decrypted by means of a pre-set decryption algorithm corresponding to the target multimedia file to obtain decrypted frame data.

The pre-set decryption algorithm corresponding to the target multimedia file matches an encryption algorithm used to encrypt the target multimedia file. The decryption algorithm may be pre-stored in a player, or be obtained temporarily from a server, which is not limited in the present disclosure.

In step S640, multimedia playback is performed by using the decrypted payload data and the unencrypted frame data.

After the decrypting process, there is no encrypted frame data in the payload data in the multimedia file, thereby achieving the lossless playback of the multimedia file. In the specific playback, the payload data may be decoded by selecting a decoder in a corresponding format according to a format of the multimedia file, to obtain multimedia data, thereby achieving the multimedia playback.

In addition, it may be determined firstly whether the target multimedia file is an encrypted multimedia file when a user triggers the target multimedia file. If so, the method proceeds according to the flow shown in FIG. 6, and if not, the method may proceed according to the conventional processing flow.

Based on the method for processing a multimedia file according to the embodiment of the present disclosure, upon an operation of triggering the target multimedia file by a user, the target multimedia file is decoded to acquire payload data formed by some pieces of frame data, and a user identity is verified. In a case that it is determined that the user does not have the permission to decrypt the target multimedia file, multimedia playback is performed by using the payload data directly. In this case, the quality of the multimedia file played may be reduced. In a case that it is determined that the user has the permission to decrypt the target multimedia file, the frame data carrying an encryption identifier is decrypted by invoking a decryption algorithm corresponding to the target multimedia file, and multimedia playback is performed by using the decrypted payload data. In this case, the played multimedia file is lossless, and the quality thereof is high.

Based on the method for processing a multimedia file shown in FIG. 6, a device for processing a multimedia file is further provided according to the present disclosure, which corresponds to the above method for processing a multimedia file. The device for processing a multimedia file may be applied to a player.

Figure 7:
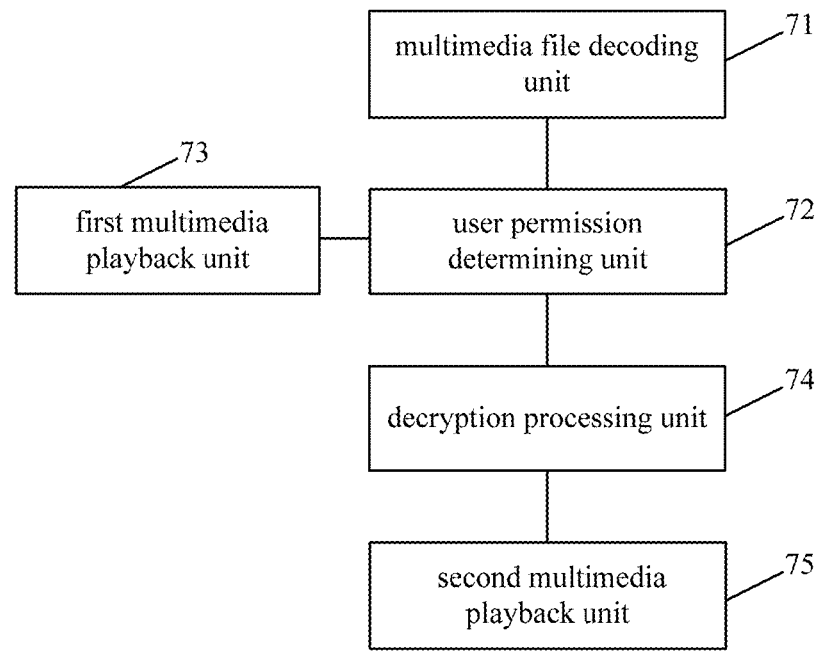
FIG. 7 is a schematic structural diagram of a device for processing a multimedia file according to another embodiment of the present disclosure.

Reference is made to FIG. 7, which is a schematic structural diagram of a device for processing a multimedia file according to another embodiment of the present disclosure.

As shown in FIG. 7, the device includes a multimedia file decoding unit 71, a user permission determining unit 72, a first multimedia playback unit 73, a decryption processing unit 74 and a second multimedia playback unit 75.

The multimedia file decoding unit 71 is configured to decode a target multimedia file, in response to an operation of triggering the target multimedia file by a user, to acquire payload data formed by multi-frame data.

The user permission determining unit 72 is configured to determine whether the user has permission to decrypt the target multimedia file.

The first multimedia playback unit 73 is configured to perform multimedia playback by using the unencrypted frame data in the payload data, in a case of a negative determination from the user permission determining unit 72.

The decryption processing unit 74 is configured to decrypt the encrypted frame data in the payload data by means of a pre-set decryption algorithm corresponding to the target multimedia file to obtain decrypted frame data, in a case of a positive determination from the user permission determining unit 72. The pre-set decryption algorithm corresponding to the target multimedia file matches an encryption algorithm used to encrypt the target multimedia file.

The second multimedia playback unit 75 is configured to perform multimedia playback by using the decrypted payload data and the unencrypted data.

Based on the method for processing a multimedia file according to the embodiment of the present disclosure, upon an operation of triggering the target multimedia file by a user, the target multimedia file is decoded to acquire payload data formed by some pieces of frame data, and a user identity is verified. In a case that it is determined that the user does not have the permission to decrypt the target multimedia file, multimedia playback is performed by using the payload data directly. In this case, the quality of the multimedia file played may be reduced. In a case that it is determined that the user has the permission to decrypt the target multimedia file, the frame data carrying an encryption identifier is decrypted by invoking a decryption algorithm corresponding to the target multimedia file, and multimedia playback is performed by using the decrypted payload data. In this case, the played multimedia file is lossless, and the quality thereof is high.

A server is further provided according to an embodiment of the present disclosure. The server may include the device for processing multimedia file shown above in FIG. 2, and the description of the device for processing a multimedia file may refer to the above description of corresponding parts, which is not repeated herein.

Figure 8:
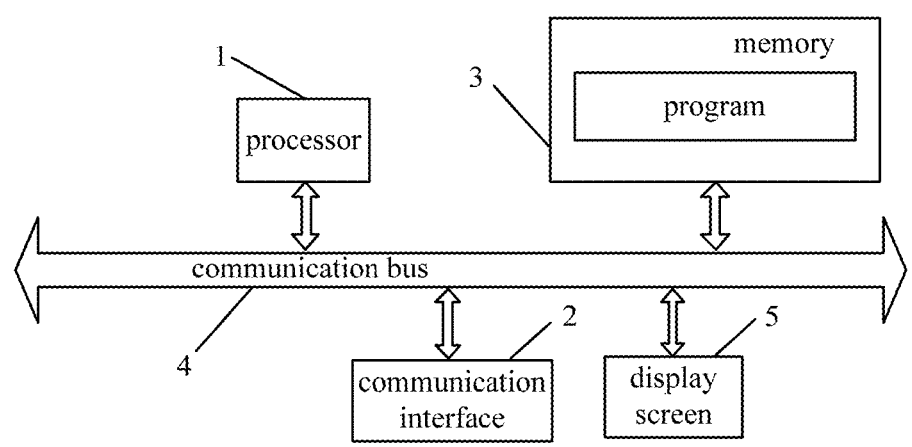
FIG. 8 is a schematic diagram of a hardware structure of a server according to an embodiment of the present disclosure.

Hereinafter a hardware structure of the server is described according to an embodiment of the present disclosure. A part of the following description involving the processing of a multimedia file may refer to the above description of corresponding parts. FIG. 8 is a schematic diagram of the hardware structure of a server according to an embodiment of the present disclosure.

Referring to FIG. 8, the server may include a processor 1, a communication interface 2, a memory 3, a communication bus 4 and a display screen 5.

The processor 1, the communication interface 2, the memory 3 and the display screen 5 communicate with each other via the communication bus 4.

Optionally, the communication interface 2 may be an interface of a communicate module, such as an interface of a GSM module.

The processor 1 is configured to execute a program.

The memory 3 is configured to stores the program.

The program may include program codes, and the program codes include operational instructions of the processor.

The processor 1 may be a central processing unit CPU, or an application specific integrated circuit (ASIC), or one or more integrated circuits configured for embodying the embodiment of the present disclosure.

The memory 3 may include a high-speed RAM memory, or may also include a non-volatile memory, such as at least one disk memory.

The program may enable the processor to execute the following operations:

acquiring payload data in a multimedia file to be processed, with the payload data including multi-frame data forming the multimedia file;

selecting frame data to be encrypted from the payload data based on a pre-set strategy;

encrypting the frame data to be encrypted, setting an encryption identifier in a frame header of the frame data to be encrypted, and forming new payload data by the encrypted frame data and unencrypted frame data; and encoding the new payload data to obtain an encoded multimedia file.

A device for processing a multimedia file is provided according to another embodiment, which includes a processor and a non-volatile memory storing multiple software units. The multiple software units include a payload data acquiring unit configured to acquire payload data in a multimedia file to be processed, with the payload data including multi-frame data forming the multimedia file; a payload data selecting unit configured to select frame data to be encrypted from the payload data based on a pre-set strategy; an encryption processing unit configured to encrypt the frame data to be encrypted and form new payload data by the encrypted frame data and unencrypted frame data; and an encoding processing unit configured to encode the new payload data to obtain an encoded multimedia file.

A device for processing a multimedia file is provided according to another embodiment, which includes a processor and a non-volatile memory storing multiple software units. The multiple software units include a multimedia file decoding unit configured to decode a target multimedia file, in response to an operation of triggering the target multimedia file by a user, to acquire payload data formed by multi-frame data, with the payload data including encrypted frame data and unencrypted frame data; a user permission determining unit configured to determine whether the user has the permission to decrypt the target multimedia file; a first multimedia playback unit configured to perform multimedia playback by using the unencrypted frame data in the payload data, in a case of a negative determination from the user permission determining unit; a decryption processing unit configured to decrypt the encrypted frame data in the payload data by means of a pre-set decryption algorithm corresponding to the target multimedia file to obtain decrypted frame data, in a case of a positive determination from the user permission determining unit, with the pre-set decryption algorithm corresponding to the target multimedia file matching an encryption algorithm used to encrypt the target multimedia file; and a second multimedia playback unit configured to perform multimedia playback by using the decrypted frame data and the unencrypted frame data.

It should be noted that, in the present disclosure, the relational terms, such as first and second or the like, are used merely to distinguish one entity or operation from another entity or operation, without necessarily requiring or implying that any such actual relations or orders exist among the entities or operations. Moreover, terms such as, "including", "comprising", or any other variation thereof, are intended to cover a non-exclusive inclusion, such that a process, a method, an article, or an apparatus including a series of elements may not only include those elements, but include other elements not expressly listed or inherent to the process, the method, the article, or the apparatus. Without more constraints, an element preceded by "includes a . . . " does not preclude the existence of additional identical elements in the process, the method, the article, or the apparatus that includes the element.

Various embodiments of the present specification are described in a progressive manner and each embodiment places emphasis on the difference from other embodiments. Therefore, one embodiment can refer to other embodiments for the same or similar parts.

According to the above description of the disclosed embodiments, the present disclosure can be implemented or used by those skilled in the art. Various modifications made to these embodiments may be obvious for those skilled in the art, and a normal principle defined in the present disclosure may be implemented in other embodiments without departing from the spirit or scope of the disclosure. Therefore, the present disclosure is not limited to the embodiments described herein but confirms to a widest scope in accordance with the principles and novel features disclosed in the present disclosure.

The invention claimed is:

1. A method for processing a multimedia file, comprising:
acquiring payload data in the multimedia file, wherein the payload data comprises multi-frame data forming the multimedia file, wherein the multimedia file comprises at least one of music, video, or text, wherein based on the multimedia file comprising music, one piece of frame data of the multimedia file is audio data over a period of time, and wherein based on the multimedia file comprising video, one piece of frame data of the multimedia file is data of one image;
selecting frame data to be encrypted from the payload data based on a pre-set strategy;

encrypting the frame data to be encrypted;
forming new payload data by the encrypted frame data and unencrypted frame data; and
encoding the new payload data to obtain an encoded multimedia file,
wherein selecting the frame data to be encrypted from the payload data based on the pre-set strategy comprises:
selecting, as the frame data to be encrypted, a second pre-set number of pieces of consecutive frame data from the payload data at an interval of a first pre-set number of pieces of frame data, wherein the first pre-set number of pieces of frame data in between the selected and encrypted second pre-set number of pieces of consecutive frame data constitutes the unencrypted frame data in the new payload data,
and wherein the method is performed by a processor.

2. The method according to claim 1, wherein encrypting the frame data to be encrypted comprises encrypting the frame data to be encrypted in units of frames.

3. The method according to claim 2, wherein encrypting the frame data to be encrypted comprises encrypting the frame data to be encrypted by a symmetric encryption algorithm.

4. The method according to claim 2, further comprising setting an encryption identifier in a frame header of the encrypted frame data, and wherein the encryption identifier identifies frame data which has been encrypted.

5. The method according to claim 1, wherein encrypting the frame data to be encrypted comprises encrypting the frame data to be encrypted by a symmetric encryption algorithm.

6. The method according to claim 5, further comprising setting an encryption identifier in a frame header of the encrypted frame data, and wherein the encryption identifier identifies frame data which has been encrypted.

7. The method according to claim 1, further comprising setting an encryption identifier in a frame header of the encrypted frame data, and wherein the encryption identifier identifies frame data which has been encrypted.

8. A device for processing a multimedia file comprising a processor and a memory for storing program instructions, wherein the processor is configured to execute the program instructions to:
acquire payload data in the multimedia file, wherein the payload data comprises multi-frame data forming the multimedia file, wherein the multimedia file comprises at least one of music, video, or text, wherein based on the multimedia file comprising music, one piece of frame data of the multimedia file is audio data over a period of time, and wherein based on the multimedia file comprising video, one piece of frame data of the multimedia file is data of one image;
select frame data to be encrypted from the payload data based on a pre-set strategy;
encrypt the frame data to be encrypted and form new payload data by the encrypted frame data and unencrypted frame data;
encode the new payload data to obtain an encoded multimedia file; and
providing a decryption permission to a member user, wherein the encoded multimedia file is decrypted and played on a first terminal of a member user at lossless quality, and the encoded multimedia file is directly played on a second terminal of a non-member user without decryption permission at a reduced quality,
wherein the processor is further configured to execute the program instructions to:

select, as the frame data to be encrypted, consecutive frame data from the payload data; or select, as the frame data to be encrypted, a second pre-set number of pieces of consecutive frame data from the payload data at an interval of a first pre-set number of pieces of frame data.

9. The device according to claim 8, wherein the processor is further configured to execute the program instructions to encrypt the frame data to be encrypted in units of frames.

10. The device according to claim 9, wherein the processor is further configured to execute the program instructions to encrypt the frame data to be encrypted by a symmetric encryption algorithm.

11. The device according to claim 9, wherein the processor is further configured to execute the program instructions to set an encryption identifier in a frame header of the encrypted frame data, and wherein the encryption identifier identifies frame data which has been encrypted.

12. The device according to claim 8, wherein the processor is further configured to execute the program instructions to encrypt the frame data to be encrypted by a symmetric encryption algorithm.

13. The device according to claim 8, wherein the processor is further configured to execute the program instructions to set an encryption identifier in a frame header of the encrypted frame data, and wherein the encryption identifier identifies frame data which has been encrypted.

14. A non-transitory computer storage medium comprising computer executable instructions that, when executed by a processor, cause the processor to perform a method for processing a multimedia file, wherein the method for processing a multimedia file comprises:
    acquiring payload data in the multimedia file, wherein the payload data comprises multi-frame data forming the multimedia file, wherein the multimedia file comprises at least one of music, video, or text, wherein based on the multimedia file comprising music, one piece of frame data of the multimedia file is audio data over a period of time, and wherein based on the multimedia file comprising video, one piece of frame data of the multimedia file is data of one image;
    selecting frame data to be encrypted from the payload data based on a pre-set strategy;
    encrypting the frame data to be encrypted;
    forming new payload data by the encrypted frame data and unencrypted frame data; and
    encoding the new payload data to obtain an encoded multimedia file,
wherein selecting the frame data to be encrypted from the payload data based on the pre-set strategy comprises:
selecting, as the frame data to be encrypted, a second pre-set number of pieces of consecutive frame data from the payload data at an interval of a first pre-set number of pieces of frame data, wherein the first pre-set number of pieces of frame data in between the selected and encrypted second pre-set number of pieces of consecutive frame data constitutes the unencrypted frame data in the new payload data.

* * * * *